United States Patent [19]

Clarke

[11] Patent Number: 5,353,143
[45] Date of Patent: Oct. 4, 1994

[54] OPTICAL RECEIVER

[75] Inventor: Donald E. A. Clarke, Colchester, England

[73] Assignee: British Telecommunications public Limited company, London, England

[21] Appl. No.: 859,413

[22] PCT Filed: Oct. 18, 1990

[86] PCT No.: PCT/GB90/01607

§ 371 Date: May 26, 1993

§ 102(e) Date: May 26, 1993

[87] PCT Pub. No.: WO91/06157

PCT Pub. Date: May 2, 1991

[30] Foreign Application Priority Data

Oct. 18, 1989 [GB] United Kingdom ............... 8923488.4

[51] Int. Cl.$^5$ .................. H04J 14/08; H04B 10/06
[52] U.S. Cl. .................... 359/135; 359/189; 359/193; 307/540; 307/549; 307/552; 307/558; 375/76
[58] Field of Search ............... 359/161, 184, 185, 186, 359/187, 189, 193, 195; 307/540, 549, 550, 552, 558; 375/76

[56] References Cited

U.S. PATENT DOCUMENTS

| 3,171,978 | 9/1961 | Weber | 307/558 |
| 3,315,033 | 4/1967 | Sennhenn et al. | 307/552 |
| 4,634,890 | 1/1987 | Lee | 307/558 |
| 4,648,133 | 3/1987 | Vilnrotter | 359/186 |
| 4,723,237 | 2/1988 | Andrew et al. | 370/11 |

FOREIGN PATENT DOCUMENTS

| 0158431 | 10/1985 | European Pat. Off. | H04B 10/14 |
| 2083963 | 3/1982 | United Kingdom | H04B 10/14 |
| 89/05070 | 6/1989 | World Int. Prop. O. | H04B 10/14 |

OTHER PUBLICATIONS

Proceedings of the IEEE 1981 National Aerospace and Electronics Conference, Dayton Convention Center, May 19–21, 1981, vol. 3, IEEE, (New York, US), D. R. Porter et al.: "Optical data bus receiver for MIL-ST-D-1553B." pp. 1319–1323.

Primary Examiner—Richard E. Chilcot, Jr.
Assistant Examiner—R. Bacares
Attorney, Agent, or Firm—Nixon & Vanderhye

[57] ABSTRACT

A network head-end station (1) is arranged to receive an upstream TDMA frame comprising interleaved optical signals from a plurality of terminations (2) connected to the head-end station (1) by a fibre network (3). The upstream TDMA frame includes a quiet phase during which none of the terminations transmit. The station (1) includes an opto-electronic receiver (4), a DC clamping circuit (10) for the opto-electronic receiver (4) and a clamping pulse generator. The clamping pulse generator is arranged to generate a pulse at a predetermined time falling within the quiet phase to operate the DC clamping circuit to clamp signals received during the remainder of the TDMA frame to a DC reference level received during the quiet phase.

4 Claims, 2 Drawing Sheets

OPTICAL RECEIVER

BACKGROUND OF THE INVENTION

1. Field of the Invention

The present invention relates to a passive optical network and in particular to the design of an optical receiver for a head-end station used in such a network.

2. Related Art

The present applicants have developed a bit transport system (BTS) for use in a TPON (telephony on a passive optical network) network. In this network downstream data is broadcast in a TDMA multiplexed frame from a head-end station to a number of terminations connected to the head-end station via a passive optical fibre network. In the return or upstream direction, each termination transmits data in a predetermined time slot so that at the head-end station the data from the different terminations are interleaved to form an upstream TDMA frame of predetermined format. The optical receiver in the head-end station therefore has to cope with interleaved pulses arriving from a number of terminations. The precise number of these pulses will be indeterminate at any given instant, varying with the amount of traffic in the upstream direction. It follows that the head-end station in normal operation has to handle a wide range of mean power levels. In addition, certain fault conditions can result in a laser in one of the terminations transmitting continuously, causing an arbitrary shift in the mean levels received at the head-end station. It is important that the receiver should be capable of continuing to function without such faults significantly disrupting traffic.

SUMMARY OF THE INVENTION

According to the present invention, there is provided a network head-end station arranged to receive an upstream TDMA frame comprising interleaved optical signals from a plurality of terminations connected to the head-end station by a fibre network, the station including an opto-electronic receiver and a DC clamping circuit for the opto-electronic receiver, characterised in that: the terminations are arranged such that none of the terminations transmit in a quiet phase of the upstream TDMA frame; the DC clamping circuit is arranged, when operated, to clamp signals received during the remainder of the TDMA frame to a DC reference level received during the quiet phase; and the station further including a clamping pulse generator arranged to generate a pulse at a predetermined time falling within the quiet phase to operate the DC clamping circuit.

By providing a DC clamping circuit in the head-end opto-electronic receiver and timing the operation of that clamping circuit to fall within a predetermined quiet phase in the upstream TDMA frame, the present invention avoids the need for tracking the widely varying DC levels at the head-end receiver and so considerably simplifies the design of that receiver. The timing of the transmissions from the terminations is arranged so that no correctly functioning termination transmits signals timed to arrive during the quiet phase. If however a faulty termination includes a laser which is continuously ON then power from that termination will be received during the quiet phase and is effectively cancelled by the DC clamping process. A failure of this sort can therefore disrupt the upstream traffic for no longer than the period from the first occurrence of the fault to the next clamping pulse.

Preferably the head-end station is arranged to receive TDMA frames including phase-1 ranging pulses, phase-2 ranging pulses and immediately following the phase-2 ranging pulses a plurality of data frames and the clamping pulse generator is arranged to generate a pulse timed to fall in a quiet phase between the phase-1 ranging pulses and the phase-2 ranging pulses.

In order to synchronise the operation of the terminations it is necessary to compensate for the different path lengths between the head-end station and different terminations. The calculation of the delay to the nearest clock cycle and the setting of a complementary delay in the timing of the transmissions from the termination concerned is termed phase-1 ranging and in the preferred aspect of the present invention the upstream TDMA frame includes a portion dedicated to phase-1 ranging pulses. In general the phase-1 ranging delay only needs to be set when a termination is first coupled to the network. In the normal operation of the network however there are continual small variations in the phase of the signals arriving at the head-end station arising from, for example, local temperature fluctuations in the optical fibres. In order to measure and compensate for these small phase variations the TDMA frame includes a section for receiving what are termed phase-2 ranging pulses, used to monitor and control these variations in phase. It is necessary to separate the phase-1 and phase-2 ranging pulses and so it is found that the quiet phase for the DC clamping pulse may advantageously be positioned between the phase-1 and phase-2 ranging sections of the upstream TDMA frame.

BRIEF DESCRIPTION OF THE DRAWINGS

A head-end station in accordance with the present invention will now be described in detail with reference to the accompanying drawings in which.

DETAILED DESCRIPTION OF EXEMPLARY EMBODIMENTS OF THE INVENTION

Figure 1:
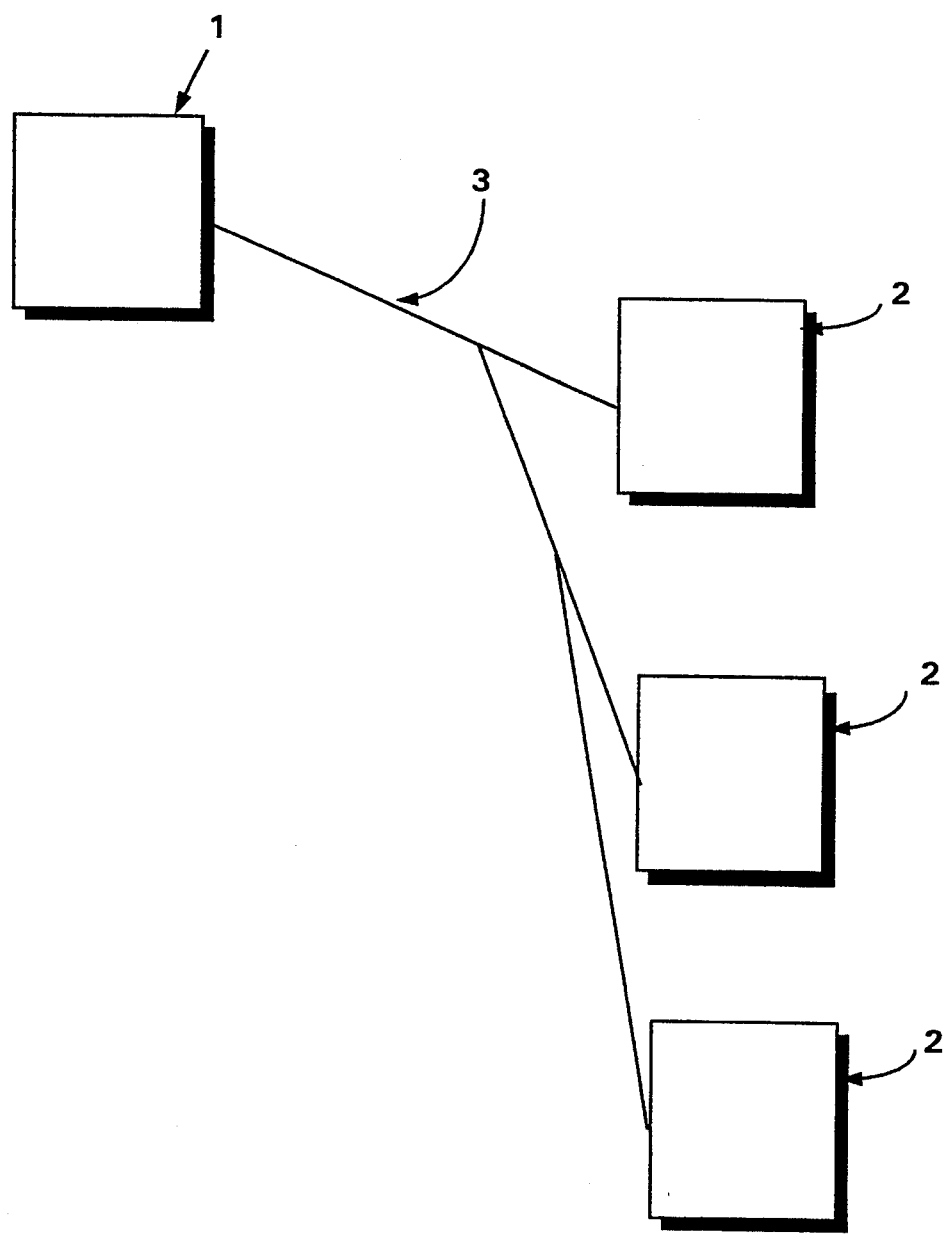
FIG. 1 is a diagram showing a TPON network.

A TPON network comprises a head-end station 1, and a number of terminations 2 linked to the head-end station 1 by a passive optical fibre network 3. For clarity, only three terminations are shown in FIG. 1 although in practice many more terminations are connected to each head-end station, and similarly the fibre network 3 includes many more branches.

In the downstream direction, TDMA (time division multiple access) frames are broadcast from the head-end station 1 to all the terminations 2 on the fibre network 3. In the upstream direction, each termination 2 transmits an optical signal in a predetermined time slot. At the head-end station 1 the optical signals from the different terminations 2 interleave to form the upstream TDMA frame in a predetermined format.

The network operates synchronously, the terminations 2 deriving a clock from the received broadcast downstream frames. The timing of the transmission of upstream data is advanced or retarded by each termination in response to control signals received from the head-end station 1. In order to assess the timing and phase of the transmissions from each termination the upstream TDMA frame includes a phase-1 ranging section and a phase-2 ranging section. Each termination 2 transmits a ranging pulse in each of these sections, and the phase and timing of each pulse is determined by the head-end station.

Figure 2:
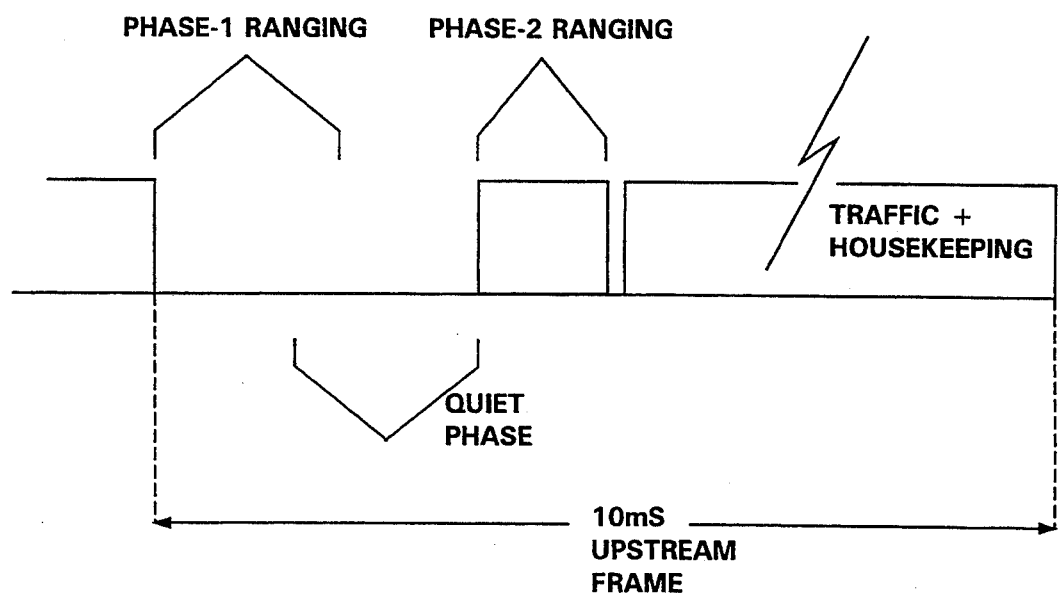
FIG. 2 is a diagram showing the upstream TDMA frame structure.
Figure 3:
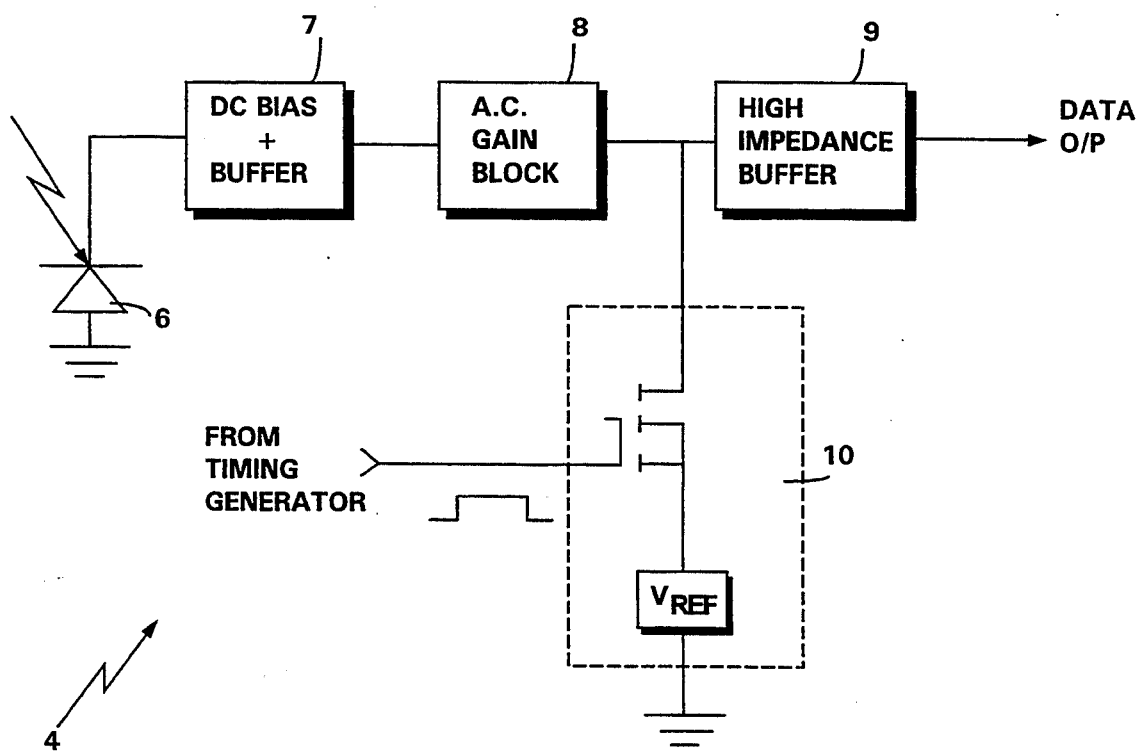
FIG. 3 is a block diagram of an optical receiver suitable for use in the head-end station of FIG. 1.

The structure of the upstream TDMA frame is shown in FIG. 2. The phase-1 and phase-2 ranging pulses precede frames carrying traffic and housekeeping data. A quiet phase is provided between the phase-1 and phase-2 ranging pulses and this quiet phase is used in setting the DC reference level for an opto-electronic receiver 4 in the head-end station 1, as described in further detail below.

The opto-electronic receiver 4 for the head-end station 1 includes a conventional photo-electric detector 6 which converts the incoming optical signals into an electric signal which is applied to a DC bias and buffer circuit 7. The output from the bias circuit is applied to an AC gain block 8. The gain block 8 is AC-coupled to a high impedance buffer 9 which provides the data output from the receiver. A DC clamping circuit 10 is provided at the input to the high impedance buffer 9. The clamping circuit 10 is activated by a pulse from a timing generator driven by the head-end station master clock. The clamping pulse is timed to occur during the quiet phase of the upstream TDMA frame during the 15 microseconds immediately preceding the phase-2 ranging pulses. During that quiet phase all correctly functioning terminations are guaranteed to be quiet. The background level during this quiet period then acts as the DC reference point for the duration of the remainder of the 10 mS frame.

If a faulty termination is transmitting continuously then the background level during the quiet phase is raised accordingly and the DC reference level adjusted to cancel the effects of the transmission from the faulty termination.

I claim:

1. A network head-end station arranged to receive an upstream TDMA frame comprising interleaved optical signals from a plurality of terminations connected to the head-end station by a fibre network, the station including an opto-electronic receiver and a DC clamping circuit for the opto-electronic receiver, characterised in that: the terminations are arranged such that none of the terminations transmit in a quiet phase of the upstream TDMA frame; the DC clamping circuit is arranged, when operated, to clamp signals received during the remainder of the TDMA frame to a DC reference level received during the quiet phase; and the station further including a clamping pulse generator arranged to generate a pulse at a predetermined time falling within the quiet phase to operate the DC clamping circuit.

2. A head-end station according to claim 1, in which the head-end station is arranged to receive TDMA frames including phase-1 ranging pulses, phase-2 ranging pulses and immediately following the phase-2 ranging pulses a plurality of data frames and the clamping pulse generator is arranged to generate a pulse timed to fall in a quiet phase between the phase-1 ranging pulses and the phase-2 ranging pulses.

3. A head-end station according to claim 1, in which the head-end station includes a master clock for the network and the timing of the clamping pulse generator is locked to the master clock.

4. A head-end station according to claim 1, in which the opto-electronic receiver includes a photo-electric detector arranged to convert the received optical signals into corresponding electrical signals, AC amplifier means arranged to amplify the said corresponding electrical signals and a high impedance output buffer connected to an output of the AC amplifier means, and in which the DC clamping circuit is connected between the said output and a fixed reference voltage source.

* * * * *